(No Model.)
H. BERGFELS.
BICYCLE SADDLE.
No. 517,425. Patented Apr. 3, 1894.
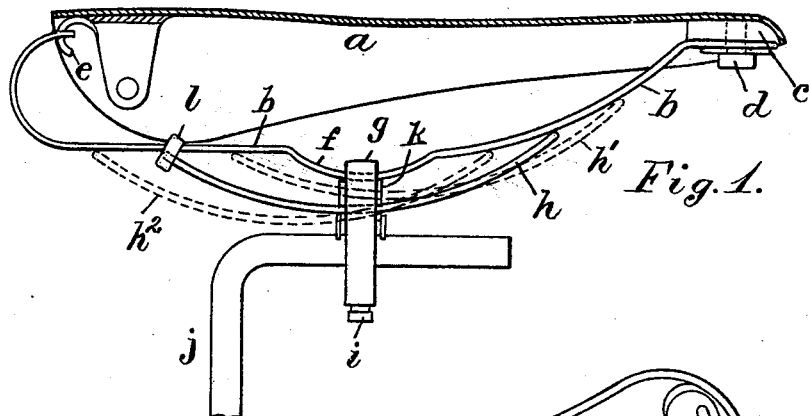
Fig. 1.
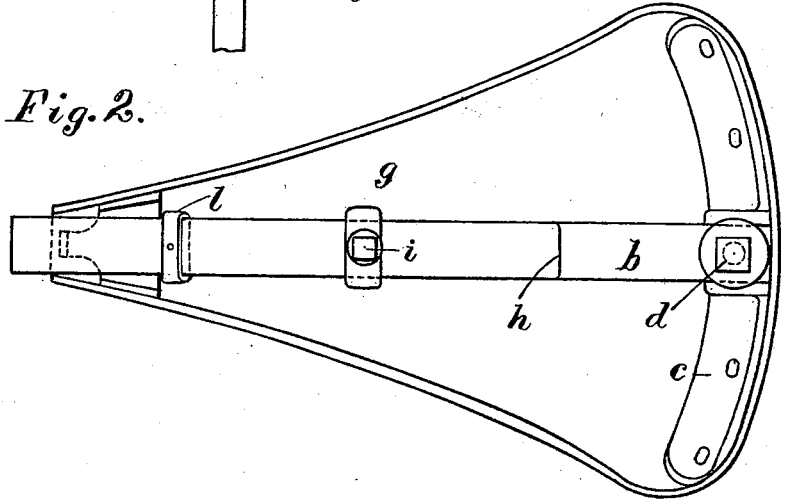
Fig. 2.
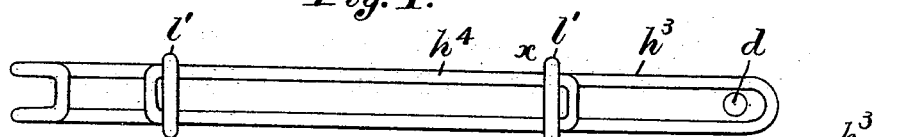
Fig. 4.
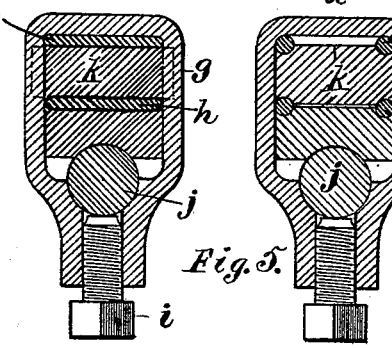
Fig. 3. Fig. 5.
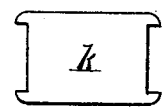
Fig. 6.
Fig. 7.
Attest:
Edw. P. Kney
W. Batson
Inventor.
Henry Bergfels, per
Crane & Miller, Attys.

UNITED STATES PATENT OFFICE.

HENRY BERGFELS, OF NEWARK, NEW JERSEY.

BICYCLE-SADDLE.

SPECIFICATION forming part of Letters Patent No. 517,425, dated April 3, 1894.

Application filed August 1, 1893. Serial No. 482,067. (No model.)

*To all whom it may concern:*

Be it known that I, HENRY BERGFELS, a citizen of the United States, residing at Newark, in the county of Essex and State of New Jersey, have invented certain new and useful Improvements in Bicycle-Saddles, fully described and represented in the following specification and the accompanying drawings, forming a part of the same.

This invention relates to an improved means for varying the elastic resistance of the supporting spring in a bicycle saddle and the invention consists in the combination with the seat post clamp, of a main spring bar clamped therein and having the seat leather attached to its opposite ends, and a separate spring bar secured adjustably in the clamp with its ends curved upwardly to the under side of the main spring bar. The middle portion of the main bar is preferably curved downward to adjust the saddle at different angles upon the seat post, and the separate spring bar is preferably made adjustable within the post clamp so as to vary its effect upon the main spring bar.

The operation of the invention will be understood by reference to the annexed drawings, in which—

Figure 1 is a side elevation of a saddle with the seat leather in section where hatched. Fig. 2 shows the under side of the saddle. Fig. 3 is an end view of the clamp with sections of the bars upon a larger scale. Fig. 4 is a plan of the spring made of round wire. Fig. 5 shows the clamp for the same. Fig. 6 is a cross section on line $xx$ in Fig. 4; and Fig. 7 is a plan of the spacing-block for separating the bars inside the clamp.

The construction shown in the drawings is as follows: The seat leather $a$ is strained by the extension of the main spring bar $b$ which is attached to the cantle $c$ by bolt $d$ and to the pommel $e$ by a hook $e'$. The main bar $b$ is preferably reflexed at the forward end and is provided with a downward curve $f$ near the middle to which the clamp $d$ is applied. The auxiliary bar $h$ is curved in a segment of a circle with its ends bent upwardly toward the main bar $b$, and it is held in the clamp by the pressure of the set screw $i$, by which the clamp is attached to the seat post $j$. A spacing block $k$ is inserted within the strap of the clamp, and determines by its thickness the adjustment of the ends of the bar $h$ toward the main bar $b$. The auxiliary bar $h$ is shown provided at the forward end with a guide or strap-loop $l$ adapted to embrace the bar $b$, to hold the curved bar from lateral displacement. The curved bar is shown in full lines with its ends projecting equally at each side of the clamp; and thus adapted to resist equally the depression of the main bar $b$ at its front or rear end. It will be readily understood that the main spring bar $b$ tilts upon the fulcrum $g$ as the weight is thrown upon its front or rear end, being somewhat elevated at the front when it is depressed at the rear. As the weight of the rider rests chiefly upon the rear end of the saddle, it is obvious that the weight of a heavy rider may be compensated by sliding the auxiliary curved bar backward into the position shown in dotted lines $h'$ and there clamping it so as to present its resistance close to the rear of the seat leather. Upon the contrary the supporting power of the main bar under the rear of the seat may be greatly diminished, and its flexibility increased by adjusting the auxiliary bar in advance of its middle position as shown in the dotted lines $h^2$. It will be understood that the auxiliary bar adds its elastic resistance to that of the main bar and thus furnishes a highly elastic support for the seat; while it affords the means of varying the resistance in the required manner.

In Figs. 1 to 3 inclusive the spring bars are represented of flat leaves; but the bars may be made of wire rods of any cross section as shown in the round rods lettered $h^3$, $h^4$ in Figs. 4 to 6 inclusive. In such case the guide or strap $l'$ may be formed of bent wire, and applied to both ends of the auxiliary spring.

When a heavy load is imposed upon the rear of the saddle, the loop $l$ serves to link the forward end of the spring bar $h$ movably to the forward part of the main bar $b$ and to couple the resistance of both bars at their forward ends. Without the loop it is obvious that a great depression of the main spring bar at its rear end would separate the two spring bars in front. The loop is fitted movably to one of the bars to slide when the bars are depressed. By curving the auxiliary bar and inserting a distance block $k$ between the two bars I limit the contact of the bars to the end portions of the curved bar, and thus maintain a greater leverage for the arms of the curved bar than is secured when flat leaves, in contact throughout their entire length, are employed. With such flat leaves, the auxiliary leaf invariably breaks at its fulcrum; as the pressure operates to bend it at such point.

Having thus set forth the nature of my invention, what I claim herein is—

1. In a bicycle saddle, the combination, with the seat post clamp, of the main spring bar $b$ clamped therein and having the seat leather attached to its opposite ends, and the spring bar $h$ secured adjustably in the clamp with its ends curved upwardly to the under side of the main spring-bar, substantially as set forth.

2. In a bicycle saddle, the combination, with the seat post clamp, of the main spring bar $b$ having the downward curve $f$ near the middle of its length, the seat post clamp $g$ applied thereto, the seat leather $a$ attached under tension to the opposite ends of the main spring bar, and the curved bar $h$ secured in the clamp with the intermediate distance piece $k$, the whole arranged and operated substantially as herein set forth.

In testimony whereof I have hereunto set my hand in the presence of two subscribing witnesses.

HENRY BERGFELS.

Witnesses:
WILLIAM BATSON,
THOMAS S. CRANE.